United States Patent
Johnson et al.

(10) Patent No.: US 8,489,808 B2
(45) Date of Patent: Jul. 16, 2013

(54) SYSTEMS AND METHODS OF PRESENTING VIRTUAL TAPE PRODUCTS TO A CLIENT

(75) Inventors: Neil Johnson, Cam Gloucestershire (GB); Mark Robert Watkins, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 12/256,353

(22) Filed: Oct. 22, 2008

(65) Prior Publication Data

US 2010/0100676 A1     Apr. 22, 2010

(51) Int. Cl.
*G06F 12/08*     (2006.01)

(52) U.S. Cl.
USPC .................................. 711/112; 711/6; 711/148

(58) Field of Classification Search
None
See application file for complete search history.

(56) References Cited

U.S. PATENT DOCUMENTS

| 6,070,224 | A | 5/2000 | LeCrone et al. | |
|---|---|---|---|---|
| 6,260,110 | B1 | 7/2001 | LeCrone et al. | |
| 6,341,329 | B1 | 1/2002 | LeCrone et al. | |
| 7,007,129 | B2 | 2/2006 | Sekine et al. | |
| 7,200,546 | B1 | 4/2007 | Nourmohamadian et al. | |
| 2003/0046461 | A1* | 3/2003 | Sivertsen | 710/74 |
| 2005/0125189 | A1* | 6/2005 | Clegg et al. | 702/124 |
| 2006/0047905 | A1* | 3/2006 | Matze et al. | 711/114 |
| 2008/0177871 | A1* | 7/2008 | Howard et al. | 709/222 |
| 2008/0301363 | A1* | 12/2008 | Kitamura et al. | 711/111 |

* cited by examiner

*Primary Examiner* — Than Nguyen

(57) ABSTRACT

Systems and methods for presenting virtual tape products to a client are disclosed. An exemplary method may include allocating a plurality of disks connected to a host bus adapter (HBA) as both virtual tape storage and virtual disk storage. The method may also include translating at the HBA an input/output (I/O) communication between the client and the plurality of disks to access at least a portion of the plurality of disks allocated as virtual tape storage. The method may also include handling all other I/O communication between the client and the plurality of disks for access to the plurality of disks allocated as virtual disk storage.

20 Claims, 3 Drawing Sheets

SYSTEMS AND METHODS OF PRESENTING VIRTUAL TAPE PRODUCTS TO A CLIENT

BACKGROUND

Tape drive storage is one of the oldest, most reliable forms of data storage for computing devices. As hard disk drives have become more reliable, faster, able to store more data, and relatively inexpensive, hard disk drives have become the preferred form of storage for individual computing devices. Server computers and even some personal computers (PCs) are now commercially available which support redundant array of independent disks (RAID) for automatic data redundancy.

However, tape drives continue to have a place in the marketplace for data backup/restore operations. For example, many computer users are comfortable with the software used for data backup/restore operations on tape drives. Accordingly, stand-alone "virtual" tape drive devices have been developed which provide a conventional tape drive interface to the user while actually storing the data on a hard disk drive.

However, this is a hardware intensive solution. Hard disk drive storage is still necessary and now the stand-alone virtual tape drive device needs to be added for backup/restore operations. Each requires their own hardware and drivers to interface with the computing device. The stand-alone nature of these virtual tape drive devices can increase overall system cost and introduces points of failure, while making inefficient use of the available hard disk drive storage.

DETAILED DESCRIPTION

Systems and methods of presenting virtual tape storage along with disk storage without need for separate devices are disclosed. Briefly, an exemplary system may include a host bus adapter (HBA) with Input/Output (I/O) control functionality. The HBA is linked to a plurality of disks by an interconnect (e.g., SAS, Fibre channel, iSCSI, etc.). The HBA allocates the plurality of disks so that a portion is used as disk storage (e.g., virtual disk drives) and another portion is used as tape storage (e.g., virtual tape drives). The HBA also handles I/O operations (e.g., read/write requests) between a client operating system (OS) and the plurality of disks. In an exemplary embodiment, the HBA translates tape storage I/O communications into small computer system interface (SCSI) commands for the plurality of disks.

Exemplary systems and methods may be implemented to provide both disk storage and tape storage to one or more computing devices, without having to provide separate disk and tape storage devices (e.g., a stand-alone device). In addition, separate hardware interfaces are not needed for the disk storage and tape storage. Data redundancy and failover may also be implemented automatically for both the disk storage and tape storage. The disk storage and tape storage may also be presented to the OS as virtual devices so that operations are transparent, i.e., the storage appears to the user as discrete disk drives and tape storage devices connected to the computing device.

Exemplary System

Figure 1:
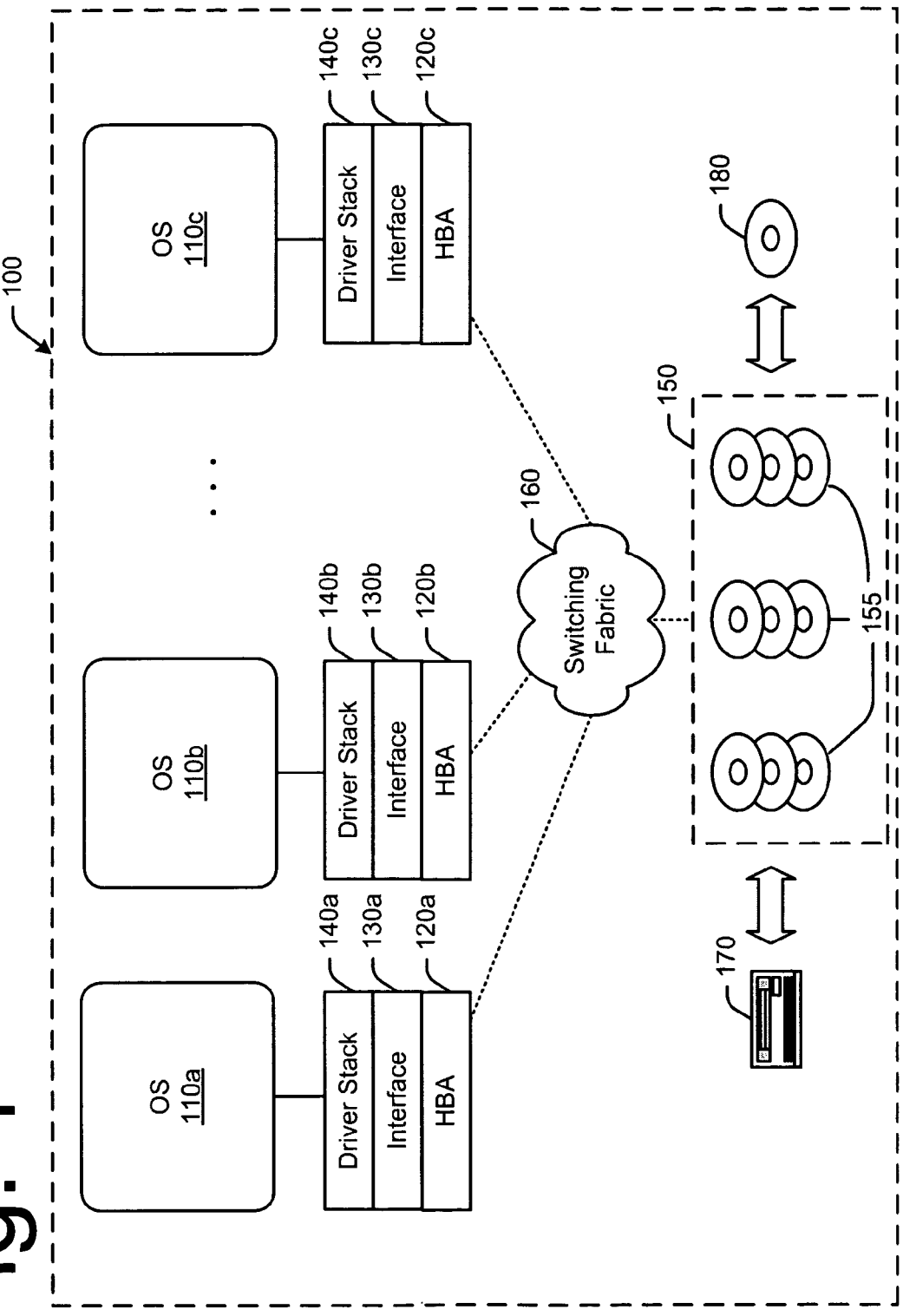
FIG. 1 is a high-level schematic diagram of an exemplary system which may be used for presenting virtual tape products to a client using disk storage.

FIG. 1 is a high-level schematic diagram of an exemplary system which may be used for presenting virtual tape products to a client using disk storage. Exemplary system 100 may include one or more clients. The clients are illustrated in FIG. 1 as operating system (OS) 110a-c. Each OS 110a-c may be executed on a separate processor, or as separate instances on a multi-partitioned processor. Each OS 110a-c may be operatively associated with respective host bus adapters (HBA) 120a-c via interfaces 130a-c and driver stacks 140a-c.

Before continuing, it is noted that the system 100 may be implemented with a single client or with multiple clients. For purpose of simplification, the OS is referred to herein as 110, the HBA is referred to as 120, the interface is referred to as 130, and the driver stack is referred to as 140, regardless of the actual number of each component being implemented in the system 100.

OS 110 may be communicatively coupled with one or more storage devices, although only a single storage device 150 is shown in FIG. 1. Storage device 150 may implement storage operations on a plurality of disks 155. For example, storage device 150 may be a RAID storage system including a number of hard disk drives. A RAID storage system enables automatic data redundancy and provides a more reliable and robust work environment. Of course, any suitable storage device 150 now known or later developed may be implemented for storage operations on any of a wide variety of media.

In an exemplary embodiment, HBA 120 may be communicatively coupled with the storage device 150 via a suitable switching fabric 160. The term "switching fabric" as used herein means the hardware and software for moving data in a networking environment by interconnecting a number of ports to establish a connection between one or more nodes. For example, the switching fabric may be implemented as an Ethernet or Fibre channel (FC) network. Of course other communication media may be also implemented, including, but not limited to, small computer system interface (SCSI), universal serial bus (USB), the 1394 standard (or Firewire®), or other data transfer topologies now known or later developed.

HBA 120 interfaces with OS 110 and the storage device 150. HBA 120 may include hardware and execute program code (e.g., firmware and/or software) to carry out the functions described in more detail below, and in particular, to handle communications with the storage device 150. For example, HBA 120 may maintain a connection with the storage device 150, allocate virtual tape storage 170 and virtual disk storage 180 within the storage device 150, map the OS 110 to virtual tape storage 170 and virtual disk storage 180, translate read/write operations between the OS 110 and the storage device 150, and schedule access requests to the storage device 150.

In an exemplary embodiment, HBA 120 is logically disconnected from the storage device 150 by default, even though a physical connection may exist (e.g., through the switching fabric 160). The HBA 120 may be mapped OS 110 to the storage device 150 to establish a logical connection for data access (read/write) operations with virtual tape storage 170 and virtual disk storage 180 on an as-needed basis.

During operation, OS 110 may address the HBA 120 to request access to virtual tape storage 170 and/or virtual disk storage 180 on the storage device 150. In an exemplary embodiment, the OS 110 may issue a request via the driver stack 140 and interface 130 identifying the virtual tape storage 170 and/or virtual disk storage 180. The HBA may then map the OS 110 to the appropriate and handle data access between the OS 110 and the storage device 150.

In an exemplary embodiment, virtual devices are mapped to the OS 110, one at a time. The HBA 120 checks availability of the requested virtual tape storage 170 and/or virtual disk storage 180, and then maps the OS 110 to the virtual tape storage 170 and/or virtual disk storage 180, if available. If the requested virtual tape storage 170 and/or virtual disk storage 180 is not available (e.g., turned off or already in use), the HBA 120 may queue the request for the OS 110. The HBA 120 may then schedule access to the virtual tape storage 170 and/or virtual disk storage 180 using any of a wide variety of criteria (e.g., first-in first-out (FIFO) or prioritized approach). In another exemplary embodiment, the same virtual tape storage 170 and/or virtual disk storage 180 may be mapped to more than one OS 110 (e.g., OS 110a and OS 110b) for simultaneous access. A cache may be enabled to handle simultaneous data access operations.

Figure 2:
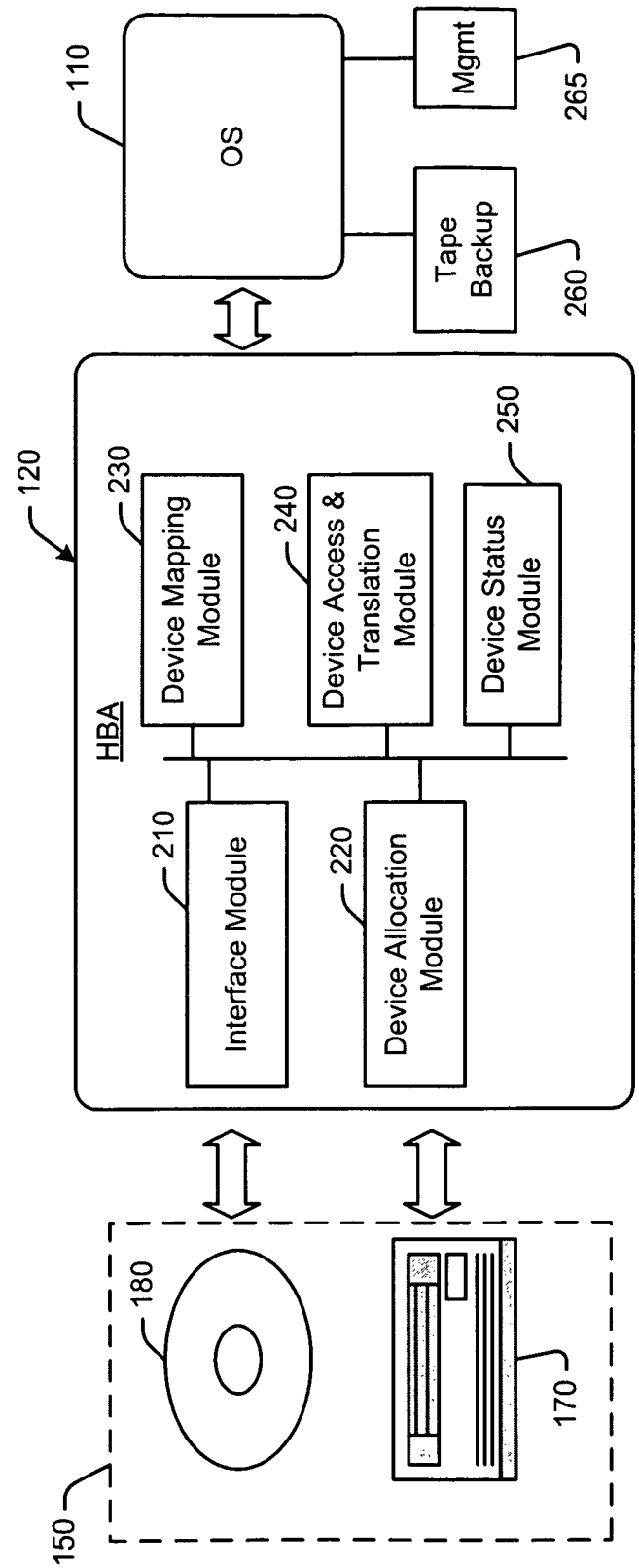
FIG. 2 is a more detailed schematic diagram of an exemplary host bus adapter (HBA) which may be implemented in the system of FIG. 1 for presenting virtual tape products using disk storage.
Figure 3:
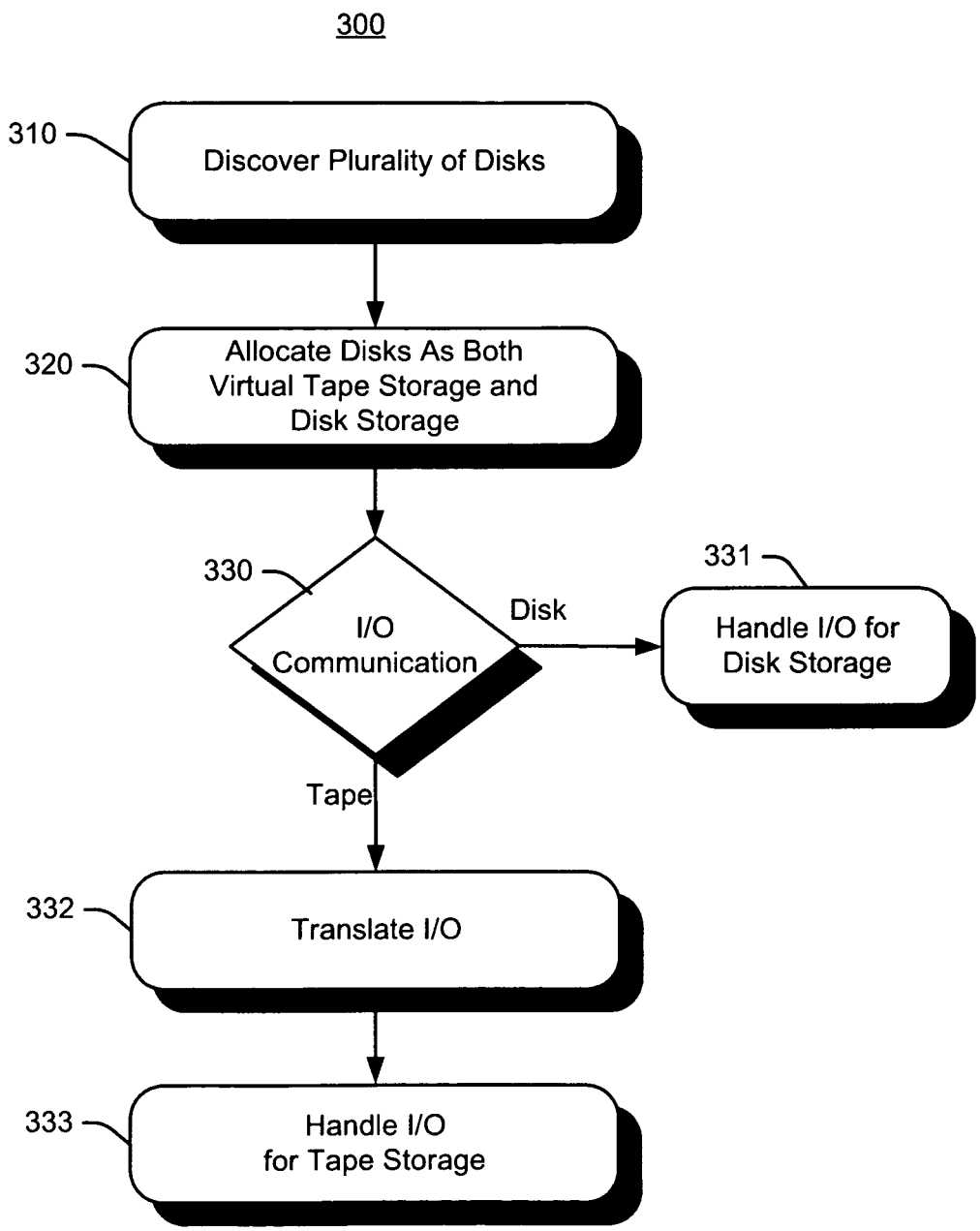
FIG. 3 is a flowchart illustrating exemplary operations for presenting virtual tape products using disk storage.

FIG. 2 is a more detailed schematic diagram of an exemplary host bus adapter (HBA) 120 which may be implemented in the system of FIG. 1 for presenting virtual tape products using disk storage. As mentioned above, HBA 120 may map the OS 110 directly to the virtual tape storage 170 and/or virtual disk storage 180 in the storage device 150. Accordingly, HBA 120 is able to directly manage virtual devices on the storage device 150 and handle data access communications with the OS.

In an exemplary embodiment, HBA 120 may include an interface module 210. Interface module 210 may be implemented to interface with OS 110 and the storage device 150. For example, interface module 210 may handle requests from the OS 110 to access a virtual device 170 and/or 180.

HBA 120 may include a device allocation module 220. The allocation module 220 may be implemented to allocate storage on one or more of the plurality of disks as either virtual tape storage 170 or as virtual disk storage 180. In exemplary embodiments, the allocation module 220 may change the allocation (e.g., ratio) from one type of virtual device to another type of virtual device. For example, a portion of the storage device initially allocated as virtual tape storage may be reallocated as virtual disk storage or vice versa, depending on the needs of the user(s).

HBA 120 may include a device mapping module 230. Device mapping module 230 may issue mapping commands to map the OS 110 to the virtual device 170 and/or 180 to logically connect and disconnect the storage device 150.

HBA 120 may also include a device access and translation module 240. Device access and translation module 240 may be implemented to route signals between the OS 110 and the storage device 150 for storage operations. Device access and translation module 240 may also be implemented to translate communications for the virtual tape storage. It is noted that the translation function needs to be invoked in both directions. For example, a tape communication from the OS (originating with the tape backup software 260) may be translated from a tape command into a SCSI command for the tape storage. Or for example, a SCSI command from the hard disk representing tape storage may be translated into a tape command for the OS because the tape backup software 260 is expecting to receive tape communications.

HBA 120 may also include a device status module 250. Device status module 250 may be implemented to monitor the status of the storage device 150 and access by OS 110. For example, device status module 250 may notify OS 110 if a virtual device is busy or otherwise unavailable. Device status module 250 may also handle other information for the storage device 150, e.g., as input by a user at the management interface 265, such as allocating physical disk space for the virtual devices 170 and/or 180.

It is noted that exemplary HBA 120 is shown and described herein merely for purposes of illustration and is not intended to be limited to any particular implementation. For example, the modules do not need to be encapsulated as the separate functional components shown in FIG. 2. In addition, HBA 120 may also write one or more logs to memory, retrieve system state information, and/or implement one or more other functions. Other functional components may also be provided to implement other functions and are not limited to those shown and described herein.

Before continuing, it should be understood that the exemplary embodiments discussed above are provided for purposes of illustration and are not intended to be limiting. Still other implementations are also contemplated.

Exemplary Operations

FIG. 5 is a flowchart illustrating exemplary operations 300 to implement virtual tape products using disk storage. The operations may be embodied as logic instructions on one or more computer-readable media. The logic instructions may be executed on one or more processing units of the HBA to implement the described operations. In an exemplary embodiment, the components and connections depicted in the figures may be used.

In operation 310 a plurality of disks may be discovered. In an exemplary embodiment, the HBA discovers the plurality of disks at start-up and/or during operation (e.g., for hot-plug operations). In operation 320, a plurality of disks connected to the HBA are allocated as both virtual tape storage and disk storage and are mapped as devices to the OS. Accordingly, the plurality of disks may be presented to the OS so that the disk storage and/or tape storage appears as actual tape media in tape drives or as distinct physical hard disk drives connected to the client.

In operation 330, a determination is made whether an I/O communication received at the HBA is a disk communication (e.g., request to read/write data on a hard disk drive) or a tape communication (e.g., a request to read/write data on a tape drive). If the I/O communication is a disk communication, no translation function is needed in order to access the virtual disk storage. Accordingly in operation 331, the HBA may access the disk storage portion of the plurality of disks.

If the I/O communication is a tape communication, a translation function is invoked so that the tape communication can be issued to the hard disk representing the tape storage. Accordingly in operation 332, the HBA may translate the I/O request. As noted above, the translation function needs to be invoked in both directions. For example, a tape communication from the OS may be translated from a tape command into a SCSI command for the tape storage. Or for example, a SCSI command from the hard disk representing tape storage may be translated into a tape command for the OS because the software (e.g., backup software 260 in FIG. 2) is expecting to receive tape communications. After translating, the HBA may access the tape storage portion of the plurality of disks in operation 333.

The operations shown and described herein are provided to illustrate exemplary embodiments for presenting virtual tape products to a client using disk storage. It is noted that the operations are not limited to the ordering shown. Still other operations may also be implemented to enable virtual tape products using disk storage.

In addition to the specific embodiments explicitly set forth herein, other aspects and implementations will be apparent to those skilled in the art from consideration of the specification disclosed herein. It is intended that the specification and illustrated embodiments be considered as examples only.

The invention claimed is:

1. A method for presenting virtual tape products to a client, comprising:
   connecting via a switching fabric individual host bus adapters (HBAs) at each of a plurality of client operating systems to a storage device, by default the individual HBAs logically disconnected from the storage device, the individual HBAs mapping the respective client operating systems to the storage device to establish a logical connection with the storage device for data access on an as-needed basis;
   allocating a plurality of disks at the storage device as both virtual tape storage and virtual disk storage;
   distinguishing at the HBA, between storage allocated as virtual tape storage and storage allocated as virtual disk storage for:
      translating at the HBA of a logically connected client operating system an input/output (I/O) communication between the client operating system and the plurality of disks to access at least a portion of the plurality of disks allocated as virtual tape storage; and
      handling all other I/O communication between the client and the plurality of disks at the same HBA for access to the plurality of disks allocated as virtual disk storage.

2. The method of claim 1 wherein the HBA concurrently handles I/O communications for the virtual tape storage and the virtual disk storage.

3. The method of claim 1 wherein the HBA presents the virtual tape storage allocated on the plurality of disks as at least one physical tape media loaded in a tape drive.

4. The method of claim 1 further comprising varying physical space allocated on the plurality of disks for the virtual tape storage and the virtual disk storage.

5. The method of claim 4 wherein varying physical space is in real-time.

6. The method of claim 4 wherein varying physical space is in response to input received by a user at a management interface.

7. The method of claim 1 further comprising supporting redundant array of independent disk (RAID) volumes on the plurality of disks.

8. The method of claim 1 further comprising propagating configuration changes on the plurality of disks to the client operating system.

9. A system comprising:
   a plurality of disks;
   an individual host bus adapter (HBA) at each of a plurality of clients, the HBA communicatively coupling the plurality of disks to a respective client operating system (OS), by default the individual HBA logically disconnected from a storage device having the plurality of disks, and the individual HBA mapping the respective client OS to the storage device to establish a logical connection with the storage device for data access on an as-needed basis;
   program code executed by the individual HBA at each of the plurality of clients to:
      allocate physical space on the plurality of disks as both virtual tape storage and as virtual disk storage;
      distinguishing at the individual HBA, between storage allocated as virtual tape storage and storage allocated as virtual disk storage; and
      translate input/output (I/O) communication between the OS and the physical space allocated as the virtual tape storage.

10. The system of claim 9 wherein the individual HBA discovers the plurality of disks at start-up and during operation in a hot-plug mode.

11. The system of claim 9 wherein the individual HBA presents the virtual tape storage allocated on the plurality of disks as at least one physical tape media loaded in a tape drive.

12. The system of claim 9 further comprising a management interface operatively associated with the program code executed by the individual HBA for configuring the plurality of disks.

13. The system of claim 9 wherein the program code varies a ratio of physical space allocated on the plurality of disks for the virtual tape storage to physical space allocated on the plurality of disks for the virtual disk storage.

14. The system of claim 9 wherein the OS addresses the HBA to request access to the storage device.

15. The system of claim 9 wherein the HBA checks availability of a requested virtual tape storage and virtual disk storage in the storage device and then maps the OS to requested storage if the requested storage is available.

16. The system of claim 15 wherein the HBA schedules access to the requested storage.

17. The system of claim 9 wherein the HBA maps virtual tape storage and virtual disk storage to more than one OS for simultaneous access.

18. A system for presenting virtual tape products to a client:
   means for allocating a plurality of disks as both virtual tape storage and virtual disk storage;
   means for distinguishing between storage allocated as virtual tape storage and storage allocated as virtual disk storage and selectively invoking at a host bus adapter (HBA) at each of a plurality of clients:
      means for translating tape requests at the host bus adapter (HBA) from a client operating system (OS) into small computer system interface (SCSI) commands for accessing the plurality of disks allocated as virtual tape storage; and
      means for translating communications at the HBA from the plurality of disks allocated as virtual tape storage into SCSI commands for return to the client OS.

19. The system of claim 18 further comprising user interface means for varying a ratio of physical space a located for the virtual tape storage and physical space allocated for the virtual disk storage.

20. The system of claim 18 further comprising means for presenting the virtual tape storage to the OS as at least one physical tape media loaded in a tape drive.

* * * * *

UNITED STATES PATENT AND TRADEMARK OFFICE
CERTIFICATE OF CORRECTION

PATENT NO. : 8,489,808 B2
APPLICATION NO. : 12/256353
DATED : July 16, 2013
INVENTOR(S) : Neil Johnson et al.

It is certified that error appears in the above-identified patent and that said Letters Patent is hereby corrected as shown below:

In the Claims:

In column 6, line 54, in Claim 19, delete "a located" and insert -- allocated --, therefor.

Signed and Sealed this
Fifteenth Day of October, 2013

Teresa Stanek Rea
*Deputy Director of the United States Patent and Trademark Office*